Figure 1:
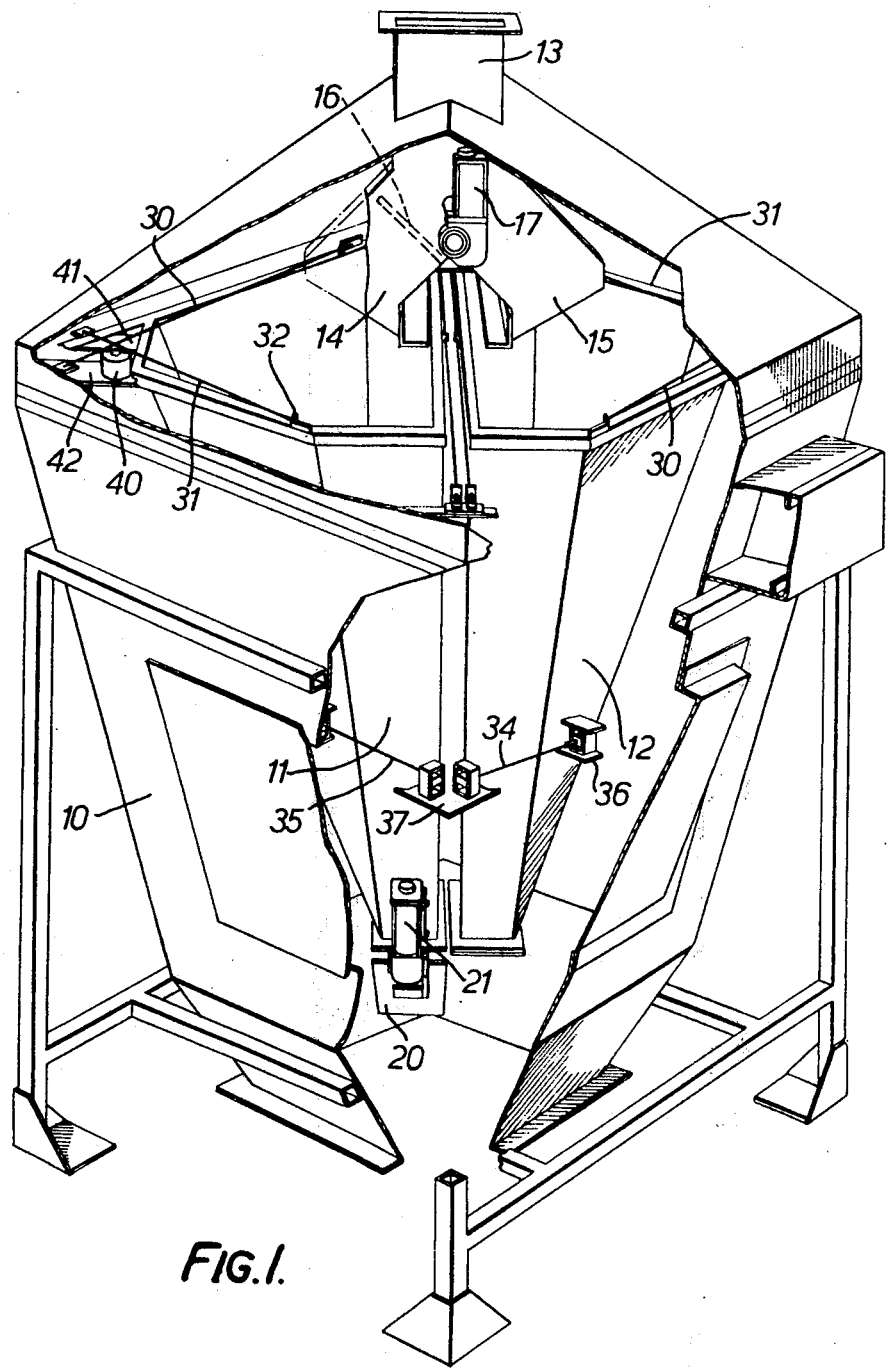

United States Patent [19]

Allen

[11] 3,966,000
[45] June 29, 1976

[54] WEIGHING APPARATUS

[75] Inventor: Clifford Edwin Allen, Cumbran, Wales

[73] Assignee: ISCA Electronics Limited, Great Britain

[22] Filed: July 3, 1975

[21] Appl. No.: 593,029

Related U.S. Application Data

[62] Division of Ser. No. 490,261, July 22, 1974.

[52] U.S. Cl. ........................... 177/1; 177/91; 177/165
[51] Int. Cl.² ................ G01G 13/22; G01G 13/14
[58] Field of Search ...................... 177/1, 90–97, 177/165

[56] References Cited
UNITED STATES PATENTS
3,522,853   8/1970   Fluur et al. ........................... 177/1
FOREIGN PATENTS OR APPLICATIONS
1,103,268   2/1968   United Kingdom ................... 177/92

*Primary Examiner*—George H. Miller, Jr.
*Attorney, Agent, or Firm*—Olson, Trexler, Wolters, Bushnell & Fosse, Ltd.

[57]          ABSTRACT

Apparatus for weighing a continuous flow of powder material, including two separate weighing hoppers, a diverting valve for switching the flow from one hopper to the other and a closure valve for emptying each hopper. Each hopper is supported for small vertical movements by a suspension system including two pairs of crossed flexible wires at upper and lower levels, with the intersections of the wires lying on a vertical axis through a load cell which thus senses the gross weight of the hopper and its load. An automatic controller with a register totals the successive recorded gross or live weights of the hoppers and subtracts successive readings of the tare weights.

5 Claims, 4 Drawing Figures

WEIGHING APPARATUS

This is a division of application Ser. No. 490,261, filed July 22, 1974.

This invention relates to weighing apparatus, and is particularly though not exclusively applicable to the weighing of particulate or powdered solid materials, or fluids, delivered in a continuous, semi-continuous, or intermittent flow or stream. The term "particulate" is not intended to be limitative on the size of the particles, which can range from microns to several inches.

Existing methods for weighing continuous or semi-continuous flows of material suffer from various disadvantages and are notoriously subject to inaccuracies. For example in the case of continuous belt type conveyors any inaccuracy in the weighing of the belt as it passes over a weighing position is cumulative in the sense that the error is continuously added to the sensed reading. Other mechanical systems involving tipping weighing hoppers are also commonly subject to inaccuracies and other disadvantages due to the somewhat insensitive mechanical weighing systems used and also to the fact that weighing takes place while material is being delivered into the hopper rather than statically, and no proper corrections are applied for the weight of any material "in flight," or retained in the weighing equipment.

Accordingly it is an object of the invention to provide an improved weighing apparatus which will overcome or partly alleviate some of the existing disadvantages.

Broadly stated from one aspect the invention consists in weighing apparatus comprising a weighing hopper, an electro-mechanical transducer for providing an electrical output signal responsive to the gross weight of the hopper and contents, if any, means for filling and emptying the hopper, a register for registering, recording or indicating the sensed weight of the hopper when charged, and means for subtracting from the said "live" weight the tare weight of the hopper as sensed by the transducer when the hopper is emptied or discharged.

It will be understood that the empty or tare weight of the hopper may vary somewhat due to variations in the quantity of material in the hopper in this condition, and this might cause a cumulative error, but the register preferably comprises an adding/subtracting counter, arranged to add successive readings of the live weight of the hopper and to subtract successive readings of the tare weight of the hopper so as to eliminate this error.

The apparatus is preferably arranged to weigh a continuous flow of the material and may include a sequencing control arranged to control the register and the filling and emptying of the hopper in a cycle which includes the steps or registering the tare weight of the hopper when empty, with no material entering the hopper, causing the flow of material to enter the hopper, sensing the live weight of the hopper when charged and again with no material entering, and emptying the hopper.

In a particular preferred form of the invention the apparatus comprises two weighing hoppers, means for diverting the incoming flow of material successively from one to the other, and means for selectively emptying one or other in sequence, and a sequencing control arranged to cause one hopper to be charged, then to divert the flow to the other hopper, then to register the live weight of the first hopper, after which the first hopper is emptied and its tare weight is registered, and then to divert the flow back to the first hopper, after which the cycle is repeated.

The invention also provides a particularly effective system for mounting a hopper or other weighing device such as a platform, and according to another aspect the invention consists in apparatus for weighing materials comprising a weighing receptacle or support such as a platform or hopper, usually with an inlet opening at its upper end, and a controlled outlet opening at its lower end, means for supporting the hopper or platform to permit limited vertical movement thereof comprising an upper flexible tension element extending horizontally in one direction from a point on the hopper or platform adjacent its upper end, to a fixed point at the same level, and a lower flexible tension element extending horizontally in another generally opposite direction from a point on the hopper or platform adjacent its lower end to a fixed point at the same level, and an electro-mechanical transducer for sensing the weight of the hopper or platform, situated at a position offset laterally from a vertical line through the centre of the hopper or platform.

Preferably the transducer is offset to one side of the hopper body or platform. The mounting system as defined above permits this without causing any inaccuracy in the sensed weight and this leaves the upper and lower ends of the hopper clear for flow of the material.

Normally the apparatus will include a pair of flexible tension members at the upper and lower levels and conveniently the two members of one pair extend in non-parallel directions as seen in plan. In this way the two members provide a degree of locating in two orthoganal horizontal directions. Preferably also the two tension members of one or both pairs cross, or intersect extended, adjacent to a point on a vertical line through the transducer. Such a support system may however allow the hopper to rotate or twist within small limits about a vertical axis and the apparatus therefore preferably includes a further horizontal tension member or members arranged to prevent appreciable rotary or twisting movements of the hopper about a vertical axis.

The apparatus may also include means for adjusting the effective length of one or each tension member, and/or the vertical position of one or both ends thereof.

Figure 2:
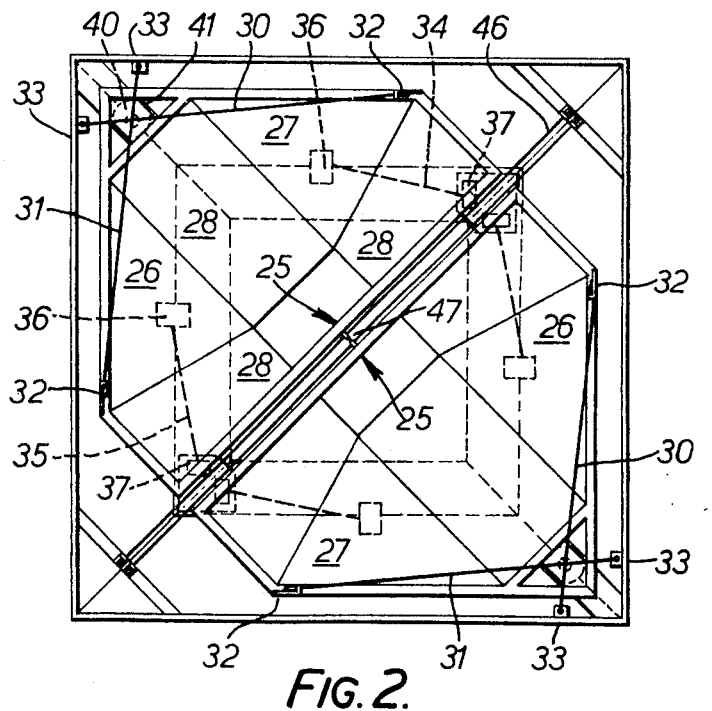
Figure 3:
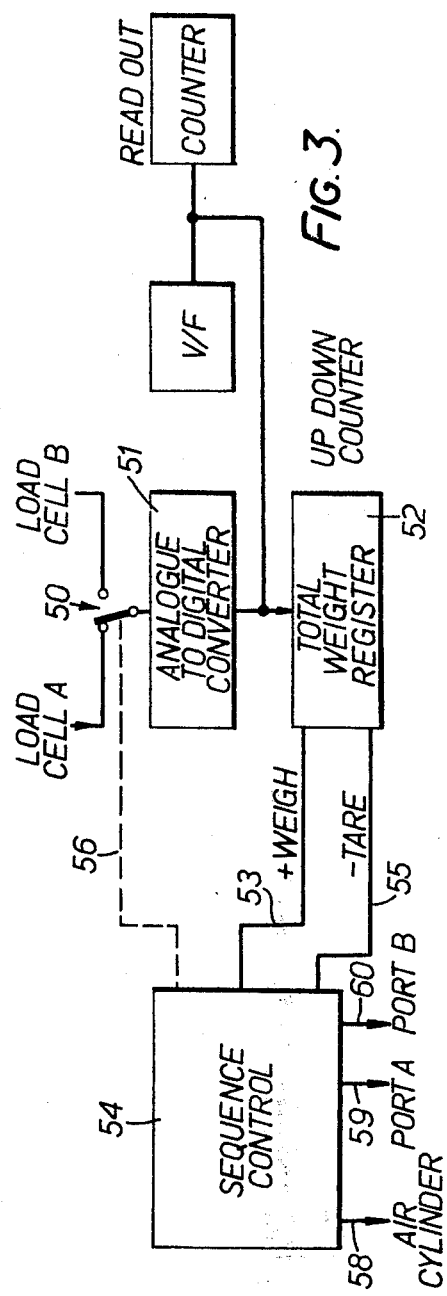
Figure 4:
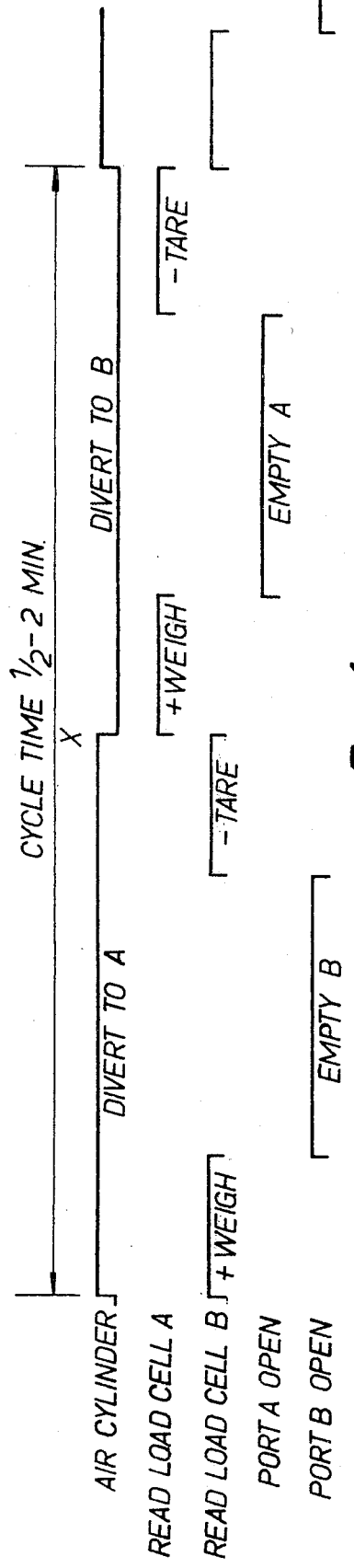

The invention may be performed in various ways and one specific embodiment will now be described by way of example with reference to the accompanying drawings, in which:

FIG. 1 is a somewhat diagrammatic perspective side elevation partly broken away, illustrating a pair of weighing hoppers according to the invention, FIG. 2 is a plan view of the apparatus with the upper inlet structure removed, FIG. 3 is a schematic diagram illustrating the control system used in conjunction with the twin hopper arrangement of FIGS. 1 and 2, and FIG. 4 is a diagram illustrating the sequence of steps in a weighing cycle.

Referring first to FIGS. 1 and 2 the weighing apparatus comprises a main casing 10 of truncated pyramid form, containing two separate weighing hoppers 11, 12. In this example the apparatus is designed to weigh in successive batches a continuous flow of a powdered material such as flour which is supplied through a vertical duct 13 above the apparatus and delivered through one or other of two discharge chutes 14, 15 controlled by a diverter flap or gate 16 actuated by a pneumatic cylinder 17. The individual hoppers are each provided with a flap or gate valve 20 at the lower end controlled by a pneumatic torque actuator 21.

As seen in plan the upper end of each hopper is open and is of generally triangular shape with a vertical side 25 and two inclined walls 26, 27. Shorter intersecting inclined walls 28 are located at the three main corners of the triangle. At the lower end of each hopper the profile is square in plan, represented by the lower ends of the three short walls 28 and the lower narrower part of the base wall 25. Each hopper is supported and suspended for small vertical movements solely by a system of horizontal flexible tension members which in this instance are in the form of stranded flexible metal wires, but could alternatively be single-strand wires, flexible straps, chains, diaphragms or pivoted links. Adjacent the upper end of the hopper there are a pair of upper horizontal wires 30, 31 each attached to the hopper body at a point 32 and attached to a fixed part of the surrounding casing 10 at a point 33. These two wires 30, 31 extend generally to the left as seen in FIG. 1 but as seen in plan in FIG. 2 they lie generally parallel with the two main sides 26, 27 of the hopper, i.e. 90° (approx.) to each other. Adjacent the lower end of the hopper there are a further pair of lower horizontal tension wires, 34, 35, each of which extends from a point 36 attached to the hopper body to a point 37 attached to the surrounding fixed hopper casing. The wires 34, 35 are also at 90° (approx.) each other and the restraint provided by these four flexible tension wires 30, 31, 34, 35 permits the hopper to move within small limits in a vertical direction only, and prevents, or severely limits lateral movement. The ends of the wires are connected to universal pivoting anchorages, which incorporate screw adjustments for varying the tension in the individual wires, and also for setting or varying the effective position of each anchorage.

An electro-mechanical load cell transducer 40 is positioned below a projecting plate 41 secured to the hopper body, the load cell being mounted on a rigid platform 42 secured to the surrounding fixed casing 10. It will be noted that this load cell is offset from a vertical through the centre of the hopper and indeed offset to one side of the whole hopper body. This leaves the hopper clear for the supply and discharge of the material. The load cell is also positioned on a vertical line passing through the point where the two tension wires 30, 31 cross, and also through the point where the extensions of the two lower tension wires 34, 35, intersect. Any tilting movement of the hopper about a horizontal axis perpendicular to the paper in a clockwise direction as seen in FIG. 1 will be resisted by the flexible tension wires. On the other hand any tendency for the hopper to rotate about the said horizontal axis in an anti-clockwise direction will simply cause the weight of the hopper to be applied to the load cell and the cell itself acts as a constraint against such anti-clockwise movement. The load cell is thus subject to the total gross weight of the hopper including any contents. Any tendency for the hopper to rotate or twist about a vertical axis is restrained by a further flexible cross wire 46 which extends horizontally parallel with the base wall 25 of the hopper and is anchored at both opposite ends to the surrounding casing 10 and fixed to a centre point of the wall at an anchorage 47. This wire need not be excessively taut and thus provides no restraint on the very small vertical movements of the hopper required to actuate the load cell but merely prevents the twisting movements referred to.

The apparatus also includes a control and recording system as illustrated in FIG. 3. As shown in this figure the output from the two load cells A and B is fed selectively via a switch 50 to an analogue-to-digital converter 51. The unit may be of known type arranged to convert the voltage signals from the load cells to a corresponding variable frequency output and this output is passed through a time controlled gate which thus acts to pass a controlled number of pulses, corresponding to the value of the voltage signal received from the respective load cell. From this unit 51 the pulses are passed to a digital register 52 in the form of an electrical addition/substraction up-down counter. The counter is arranged to count up, or add, when an input is received on line 53 from a sequence controller 54, and to subtract or count down when a signal is received on line 55. The sequence controller 54 also controls the switch 50 via a control line 56 and controls the diverter cylinder 17 via an output 58 and actuates the emptying valve torque units 21 via lines 59, 60.

The sequence of operations is illustrated diagramatically in FIG. 4. At the instant X at the centre of this figure the controller actuates the diverter unit 17 to divert the flow of flour from hopper A to hopper B. After a short interval, when no further flour is entering hopper A, the sequence controller actuates switch 50 to connect load cell A to the converter 51 and emits a signal on line 53 which causes this sensed gross weight signal to be added to the existing total (if any) in the register 52. The controller then actuates the emptying gate unit 21 to cause the hopper A to be emptied, after which the controller emits a signal on line 55 causing the signal then emitted from the load cell A, corresponding to the tare weight, to be subtracted from the total on the register 52. The difference between these two figures corresponds closely to the actual quantity of flour discharged from the hopper. The controller then again actuates the diverter unit 17 causing the flow of flour to be diverted back to hopper A, and shortly afterwards the controller reverses the switch 50 to connect the output of load cell B to the converter 51 and applies a signal to line 53 causing the signal from the converter, which corresponds to the gross live weight of hopper B, to be added in the register 52. The sequence then proceeds as shown in the left hand part of FIG. 4, and is repeated indefinitely while the apparatus is in use.

Theoretically, to measure the contents discharged from a single hopper it would be necessary to sense the tare weight of the hopper before loading, the gross live weight when charged, and the tare weight when discharged. In a continuous flow system however the continuous repeating cycle described above is accurate to within very fine limits since the tare weight of the hopper is sensed on each occasion when the hopper is charged and again when it is discharged, and the only theoretical error is the difference between the tare weight at the start of the operation, and the tare weight at the end.

It is possible to combine a twin hopper system as illustrated with further multiple twin hopper arrangements to form a compound multiple hopper system, the sequencing controller being arranged to actuate the diverter gates of each hopper system in turn and to perform the sequencing operations as described in turn on all the hoppers of the system within the total cycle time.

Instead of applying a fixed cycling time the apparatus may be arranged to cycle automatically when the sensed weight of each hopper reaches a predetermined value. The apparatus can also be operated as a dispensing or batching weigher by pre-setting the required total weight into the register and subtracting weighings until the register reaches zero, at which point the batch is complete.

I claim:

1. A method of weighing a continuous or semi-continuous flow of material, in which the flow is directed alternately between two weighing hoppers, and after filling one hopper the flow is diverted to the second hopper, during which filling operation the gross live weight of the first hopper is sensed and added to the total in a digital counter, the first hopper is emptied, and the tare weight thereof sensed and subtracted from the total in said counter, after which the flow is diverted back to the first hopper and the cycle is repeated for the second hopper.

2. Weighing apparatus for weighing a continuous or semi-continuous flow of material, comprising two weighing hoppers, means for diverting the incoming flow of material from one to the other, and discharge means for selectively emptying the said hoppers in sequence, an electro mechanical transducer associated respectively with each said hopper for providing an electrical output signal responsive to the gross weight of the hopper and contents, if any, a register for registering, recording or indicating the sensed weight of the hopper when charged or discharged, a sequencing control arranged to control said diverting means and discharge means for filling and emptying said hoppers, alternately in sequence, and the operation of said register, in a cycle which includes the steps of registering the tare weight of each hopper when empty, with no material entering the hopper, subtracting said tare weight from any previous reading in the register, causing the flow of material to enter the hopper, sensing the live gross weight of the hopper when charged, and again with no material entering, adding this gross weight to the total in the register, operating the discharge means to empty the hopper, repeating the sequence of operation for the second hopper, and repeating the whole cycle.

3. Apparatus according to claim 2, in which said register comprises an adding/subtracting counter, arranged to add successive readings of the live gross weight of the hopper and to subtract successive readings of the tare weight of the hopper.

4. Apparatus according to claim 1, and in which said sequencing control operates said diverting means to cause one hopper to be charged, and during the filling thereof causes the live gross weight of the second hopper to be sensed and registered, then actuates the discharge means to empty the second hopper, and causes the tare weight of said second hopper to be sensed and subtracted from the total reading in the register, then causes the discharge means to close, and operates said diverting means to switch the flow of material to the second hopper, after which the gross live weight of the first hopper is sensed and added in the register, and the cycle is repeated.

5. Weighing apparatus according to claim 2, wherein said sequencing control includes a timing device to initiate operation of said diverting means, and the remaining steps of said cycle, after a predetermined time interval.

* * * * *

UNITED STATES PATENT AND TRADEMARK OFFICE
CERTIFICATE OF CORRECTION

PATENT NO. : 3,966,000
DATED : June 29, 1976
INVENTOR(S) : Clifford Edwin Allen

It is certified that error appears in the above—identified patent and that said Letters Patent are hereby corrected as shown below:

Column 4, line 5, "The" should be -- This --.

Column 6, line 16, "Claim 1" should be --Claim 2--

Signed and Sealed this

First Day of February 1977

[SEAL]

Attest:

RUTH C. MASON
*Attesting Officer*

C. MARSHALL DANN
*Commissioner of Patents and Trademarks*